United States Patent Office 3,563,797
Patented Feb. 16, 1971

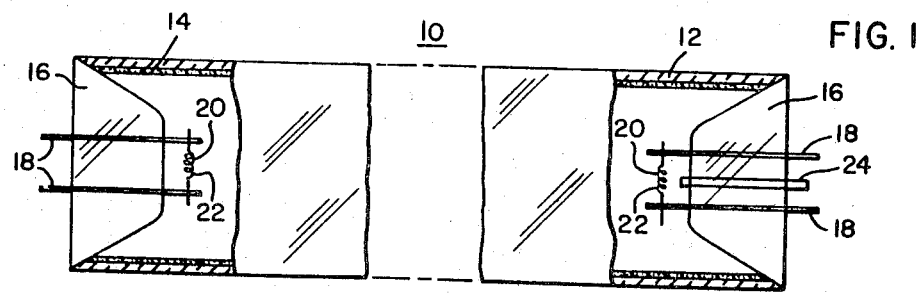
FIG. 1
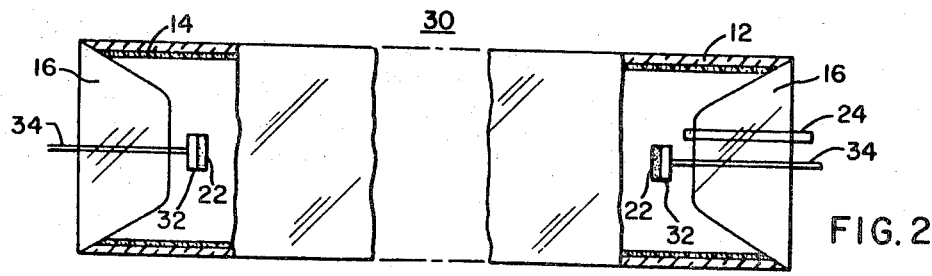
FIG. 2
```
APPLY FINELY DIVIDED MIXTURE
COMPRISING ALKALINE-EARTH
CARBONATE TO TUNGSTEN
SUPPORT MEMBER
```
FIG. 3
```
HEAT COATED TUNGSTEN MEMBER IN
AN INERT OR REDUCING ATMOSPHERE
TO DECOMPOSE ALKALINE-EARTH
CARBONATE AND FORM AN AIR-
STABLE, ADHERENT, EMISSIVE COATING
```

3,563,797
METHOD OF MAKING AIR STABLE CATHODE FOR DISCHARGE DEVICE
Robert G. Young, Nutley, and Albert W. Wainio, Livingston, N.J., assignors to Westinghouse Electric Corporation, Pittsburgh, Pa., a corporation of Pennsylvania
Continuation-in-part of application Ser. No. 618,021, Feb. 23, 1967. This application June 5, 1969, Ser. No. 830,836
Int. Cl. H01j *19/04, 19/06*
U.S. Cl. 117—223    11 Claims

ABSTRACT OF THE DISCLOSURE

Method of producing gasless, electron-emissive alkaline-earth oxide coated tungsten electrode, whereby the electrode is activated and rendered chemically stable prior to incorporation into a discharge device by heating the tungsten electrode coated with alkaline-earth metal carbonate to convert the carbonate to the oxide and render the oxide air stable.

CROSS REFERENCE TO RELATED APPLICATION

This application is a continuation-in-part of copending application Ser. No. 618,021, filed Feb. 23, 1967, and now abandoned.

BACKGROUND OF THE INVENTION

This invention relates to electron emissive, coated electrodes, and more particularly to an improved method of rendering such electrodes chemically stable in air to generally facilitate manufacturing efficiency.

The most common electron emissive materials used with fluorescent lamp electrodes are alkaline-earth metal oxides. These oxides readily combine with water and carbon dioxide in air if the oxide is not utilized immediately in manufacture. For this reason such an electrode is normally processed by coating a suitable alkaline-earth metal compound, such as a carbonate, onto the electrode support portion, and after the unactivated electrode is mounted in the lamp, the lamp is then evacuated and the alkaline-earth metal compound is heated to form the emissive oxide. This process not only necessitates electrode heat treatment during lamp production, but also produces momentarily a high pressure of carbon dioxide within the lamp. This carbon dioxide can contaminate the internal parts of the lamp and is never wholly removed during lamp exhaust, but it evolves during operation leading to a degradation of lamp performance.

Production of an emissive barium oxide in a furnace prior to lamp manufacture, which oxide is rendered air-stable by continued heating in air, is disclosed by Meister Pat. No. 2,806,970, dated Sept. 17, 1957. The emissive material produced by the method described in the above-mentioned patent is then ground, mixed with a binding agent, and coated onto an electrode coil. This method is limited to the conversion of barium carbonate to the emissive oxide state.

Fluorescent lamps which require an electrode heating or treatment process to render the coating material emissive are designed with electrode mounting stems long enough to prevent volatilization of the binding agent holding the unactivated carbonate on the tungsten support during the sealing of the mounting stem to the lamp envelope.

Electrodes which require a heat treating process after mounting in the lamp have generally utilized the resistive heating of the electrode coil and therefore require dual lead-ins for each such electrode. This utilization of the self-resistance heating of the electrode member normally limits the electrode design to a filamentary type member.

SUMMARY OF THE INVENTION

It is an object of this invention to provide a method for making a highly emissive electrode which requires substantially no treatment or degassing after incorporation into the lamp.

It is another object to provide a method for making a highly emissive electrode which is quite stable in air to facilitate the lamp manufacturing process.

It is a further object to be able to increase the amount of emissive material coated onto the support portion of the electrode.

It is an additional object to produce emissively coated electrodes having a single lead-in to thereby allow simplified and novel electrode designs.

It is still another object of this invention to provide a fluorescent lamp having a shortened electrode mounting structure to allow an increased plasma length, and a corresponding increase in light output.

The aforementioned objects, and other objects which will become apparent as the description proceeds, are achieved by coating a refractory metal support with an alkaline-earth metal carbonate to which is preferably added a small amount of selected refractory oxide. The carbonate coated support member is then heated, at a fairly uniform predetermined rate, to a firing temperature of from 1300–1750° C. The member is then fired for a time sufficient to decompose the carbonates to an emissive oxide coating which is chemically stable in air, with the lower the firing temperature the longer the firing time.

BRIEF DESCRIPTION OF THE DRAWINGS

For a better understanding of the invention, reference should be had to the accompanying drawing wherein:

FIG. 1 is a fragmentary elevation, partly in section, showing a fluorescent lamp constructed in accordance with the present invention;

FIG. 2 is similar to FIG. 1 and illustrates another fluorescent lamp embodiment constructed in accordance with the present invention; and FIG. 3 is a flow diagram setting forth the basic steps of the present invention.

DESCRIPTION OF THE PREFERRED EMBODIMENTS

The present method can be used to process any electrode which incorporates an alkaline-earth-oxide emissive coating on a high temperature resistant refractory metal substrate. Such electrodes are particularly useful in conjunction with fluorescent lamps, and hence such a lamp has been illustrated and will be described.

For a better understanding of the invention, reference is made to FIG. 1, which shows a fluorescent lamp 10 comprising a vitreous, light-transmitting, tubular envelope 12 carrying on its interior surface a phosphor coating 14, such as halophosphate, activated by manganese and antimony. Sealing off the tubular ends of the envelope 12 are vitreous electrode mounting structures or stems 16. The electrode lead-ins 18 are sealed through the stems 16. Such lead-ins 18 serve to support electrode coils 20, as well as providing an electrically conductive path to the electrode coils 20. The electrodes 20 are formed of a high temperature resistant refractory metal having suitable electrical conductance such as tungsten. The electrodes 20 carry an electron-emissive coating 22 thereon. During fabrication, the lamp is evacuated through an exhaust tube 24, and charged with mercury and an easily ionizable starting gas such as argon, as is well known.

In FIG. 2 is shown another embodiment 30 of a fluorescent lamp wherein each electrode comprises an enlarged flatened tungsten member 32 which is coated with an electron-emissive coating 22 on the inwardly extending surface thereof. A single lead-in conductor 34 is used to facilitate electrical connection and support. The other parts of the lamp embodiment 30 are the same as specified in the embodiment 10 shown in FIG. 1.

The basic steps of the present method are shown in FIG. 3. There is first coated onto a tungsten support member, such as a tungsten coil 20 or flattened tungsten member 32, a predetermined amount of finely divided material principally comprising alkaline-earth carbonate, which preferably has added thereto a small amount of suitable decomposable organic binder material, such as nitrocellulose. Thereafter, the coated member is heated in an inert or reducing atmosphere to form an air stable coating.

Specific examples of the present method are as follows:

Example I

As an example, 8.0 grams of barium carbonate, 1.0 grams of strontium carbonate, 1.0 grams of calcium carbonate, and 0.05 gram of very finely divided $Al_2O_3$ which has an average particle size of for example about 0.05 micron or less, are mechanically mixed to a uniform and finely divided consistency. A sufficient amount of nitrocellulose binder is added to allow the mixture to adhere onto the tungsten member and for the foregoing example, a binder mixture of about 3.5 cc. of nitrocellulose and about 1.5 cc. of cellulose acetate vehicle provides a suitable viscosity. About 4 milligrams of this carbonate mixture is coated onto a conventional tungsten coiled-coil, such as is used in a standard 40 watt fluorescent lamp.

The carbonate coating or paint should be applied to the coil in such a manner and amount that after firing, the emission material is not fused to or touching the adjacent secondary turns for a double wound coil, and tertiary turns for a triple wound coil. This coated coil is then heated at about 1500° C. for one hour in a flowing hydrogen atmosphere furnace to convert the carbonates to the air stable oxide emission material. The binder is volatilized and carried away during the heating. The resulting air stable coated coil has a dense thin layer of emission material. The rate at which the coated coil is brought to the firing temperature is observed to affect the nature of the emissive coating formed. It is preferred that the coil described above is brought to 1500° C. in about three minutes. If the coil is brought to temperature too quickly, an undesired tungstate composition is observed, which may be reduced during lamp operation yielding a decomposition product which detrimentally affects the lamp phosphor and performance. If the coil is brought to temperature very slowly, then the emissive layer will not be compacted, but will be fluffy, thereby limiting the amount which can be put on a given coil.

Example II

As another example, 6.0 grams of barium-carbonate, 2.0 grams of strontium carbonate, 2.0 grams of calcium carbonate, and 0.5 gram of hafnium oxide are mechanically mixed to provide a uniform and finely divided mixture. A sufficient amount of nitrocellulose binder in solution is added to allow the mixture to adhere onto the tungsten member as in the previous example. About four milligrams of this mixture is coated onto the tungsten coil. This coated coil is heated in an argon atmosphere for about six hours at about 1300° C.

In either Example I or II, the 0.05 grams of aluminum oxide or the 0.5 gram of hafnium oxide can be replaced by any one or combination of the following: 0.5 gram of zirconium oxide, 1.6 grams of tantalum pentoxide, 0.9 gram of tungsten oxide or 0.4 gram of thorium oxide, the total weight of the added oxide not exceeding about 2.5 grams.

The carbonate preferably is a triple alkaline-earth metal carbonate mixture comprising from 40–90% barium carbonate, 10–50% strontium carbonate, and 5–30% calcium carbonate by weight. These respective percentages are not critical, although the preferred mixture is about 80% barium carbonte, about 10% strontium carbonate, and about 10% calcium carbonate. As indicated in the foregoing examples, a quantity of very finely divided selected refractory oxide is desirably added to the carbonate mixture to promote stability, such as $Al_2O_3$ or $ZrO_2$ which can be used in amount of from 0.1 to 15 percent by weight of the carbonate, or $Ta_2O_5$, $WO_3$, $ThO_2$ or $HfO_2$ which can be used in amount of from 3 to 25 percent by weight of the carbonate. Any combination of such oxides within these prescribed weight percentage additions can also be used provided the total oxide addition does not exceed 25% by weight of the carbonate. The preferred additive is about 0.5 percent by weight of very finely divided aluminum oxide. The more finely divided the refractory oxide, the less needed to produce the same increase in air stabilization. It is thought that the increased stability is due to a barium aluminate surface layer which is formed when aluminum oxide is added.

The heating step which converts the carbonate to the oxide is conducted in an inert or reducing atmosphere at a temperature of from 1300° C. to 1750° C. for a period of at least five minutes, with the lower the firing temperature, the longer the firing time. The preferred heating atmosphere is hydrogen, although mixtures of hydrogen plus an inert gas such as argon can also be used, or the heating atmosphere can be an inert gas such as argon or neon. During the heating step, the carbonate decomposes to form an air-stable oxide and any binder which is present is rapidly volatilized. This heating step can also be accomplished by utilizing the self-resistive heating of the tungsten support member as an electric current is passed through the coil in the inert or reducing atmosphere.

A fired electrode produced as outlined herein has a hard glazed surface which presents a relatively small effective surface area for sorption of moisture or carbon dioxide during the lamp manufacturing process. This is in contrast to a finely divided alkaline-earth oxide. Even when barium carbonate is fired at high temperatures apart from the supporting coil to stabilize same, the fired material still requires some regrinding which increases the surfaces area available for sorption. The hard, glazed surface of the present fired material also improves the adherence of the electron-emissive material to the tungsten support during the life of the lamp.

The dense sturdy coating resulting from the present method allows an increase in the amount of emission material that can be deposited on the electrode. Heating the electrode in a furnace assures uniformity in the treatment of the alkaline earth compound regardless of the coating thickness.

The percentage weight gain of air stable oxide prepared with about 4 weight percent addition of $Al_2O_3$ is less than 0.02% after 1000 hours exposure of air. It has been observed, in evacuating a lamp containing such electrodes that about 1.5% of the amount of gas which would be evolved from a conventional emissive coating upon treating in the lamp is hereby evolved. The main gas evolved during treating, carbon dioxide, is known to react with lamp phosphors during lamp operation to impair lamp performance. It is therefore highly desirable to minimize carbon dioxide evolution inside the lamp during its processing and in the coating method here specified such evolution is minimized, in addition to speeding up the manufacturing process.

If a triple carbonate mixture is used without the additive refractory metal oxide and processed as specified the resulting electrode is still relatively stable and exhibits a weight gain of only 2.4% when exposed to air for 600 hours. It is preferred, however, to use the additive refractory oxides as specified, for increased stability. The $ZrO_2$ when used in the amount of 5% provided an air stable electrode which exhibited a weight gain of only 1.5% when exposed to the atmosphere for 800 hours. In the case of a 9% addition of $WO_3$, a 0.2% weight gain was realized after 1000 hours. Similar improvements are realized from the $Ta_2O_5$, $ThO_2$ and $HfO_2$ additives.

The electrodes produced herein allow the use of a considerably shorter electrode mounting to support and space the electrode from the seal area. With normal undecomposed cathodes there is a danger of the sealing fires removing the coating blinder, permitting some coating to fall off the coil. The electrodes produced herein have already been heated and the coating is firmly fixed to the support member. This permits the electrode members to be positioned in close proximity to each end of the lamp, and a correspondingly longer discharge path between the electrodes, providing greater light output for a given overall lamp length. An electrode mount utilizing an electrode coated as disclosed above has been tested wherein the electrode to seal distance is ½ inch, which is ¾ inch shorter than the standard 40 watt fluorescent electrode mount height. Thus the overall length of the plasma is increased by 1½ inches. Such an increased plasma is particularly important with a short length, high output lamp.

The elimination of the electrode heating process also makes possible the use of a single electrical lead-in for the electrode since there is no need to provide a heating current path. A filamentary design was formerly required to reach the high temperature needed for electrode treatment. Thus a greater variety of emissively coated electrode designs is now possible with elimination of the heating process within the sealed lamp.

Summarizing, the advantages that can be expected from the use of the gasless cathode as prepared herein are: reduction in the time of lamp exahust, reduction in the amount of pumping equipment necessary, elimination of treating tracks on the manufacturing equipment, increased coating weight and hence increased life, simplified coil design, greater control over cathode quality, no possibility of envelope sealing fires destroying the binder, use of shorter stem mounts, and no absorption of $CO_2$ by the phosphor during exhaust.

It will be recognized that the objects of this invention have been effected by providing a method for emissively coating an electrode, which method eliminates the need for an electron treatment process once the electrode is incorporated into the fluorescent lamp.

While preferred embodiments have been illustrated and described, it is to be understood that the invention is not to be limited thereto or thereby.

We claim as our invention:
1. The method of processing an emissive electrode for an electric discharge device, wherein said processed electrode comprises a selected refractory metal support member having an electron emissive coating thereon, which method comprises:
 (a) coating onto said tungsten support member a predetermined amount of finely divided material principally comprising alkaline-earth metal carbonate, and
 (b) heating said coated tungsten support member in an inert or reducing atmosphere at a temperature of from 1300° C. to 1750° C. for at least five minutes, with the lower the firing temperature the longer the firing time, to decompose said alkaline-earth carbonate to an emissive oxide coating which is chemically stable in air.
2. The method as specified in claim 1, wherein said coated member is preferably brought up to said firing temperature at a predetermined rate to minimize tungstate formation and optimize the compaction of useful oxide in a thin dense layer.
3. The method as specified in claim 1, wherein each tungsten support member has a single lead-in portion terminating in an enlarged support portion adapted to project inwardly into said discharge device, and said support member is coated with said carbonate during said processing.
4. The method as specified in claim 1, wherein said firing atmosphere principally comprises hydrogen.
5. The method as specified in claim 1, wherein said firing temperature is preferably about 1500° C., and said member is brought to the temperature in about three minutes, said firing beingp referably carried out for about one hour.
6. The method as specified in claim 1, wherein said finely divided material, as coated onto said tungsten support member, substantially comprises from 40 to 90% by weight barium carbonate, 10 to 50% by weight strontium carbonate, 5 to 30% by weight calcium carbonate, and one or more finely divided refractory oxides uniformly mixed with said carbonate as follows: $Al_2O_3$ or $ZrO_2$ in the range of from 0.1 to 15 percent by weight of said carbonate, or $Ta_2O_5$, $WO_3$, $ThO_2$ or $HfO_2$ in the range of from 3 to 25 percent by weight of said carbonate, and with the total oxide content not exceeding 25 percent by weight of said carbonate.
7. The method as specified in claim 6, wherein said triple carbonate mixture has the proportions of about 80% $BaCO_3$, about 10% $SrCO_3$, and about 10% $CaCO_3$ by weight, and to which mixture is added about 0.5% by weight of very finely divided aluminum oxide.
8. The method as specified in claim 6, wherein said finely divided refractory oxide is preferably $Al_2O_3$ with an average particle size of about 0.05 micron or less, said $Al_2O_3$ being added in an amount of about 0.5 percent by weight of said carbonate.
9. The method as specified in claim 1, wherein the heating of said coated tungsten support member is accomplished by self-resistive heating of the said tungsten member.
10. An electron-emissive, alkaline-earth oxide coated, refractory metal substrate, electrode prepared by the process as specified in claim 1.
11. The method of processing an emissive electrode for an electric discharge device, wherein said processed electrode comprises a selected refractory metal support member having an electron emissive coating thereon, which method comprises:
 (a) coating onto said refractory metal support member a predetermined amount of finely divided material principally comprising alkaline-earth metal carbonate, and
 (b) heating said coated refractory metal support member in an inert or reducing atmosphere at a temperature of from 1300° C. to 1750° C. for at least five minutes, with the lower the firing temperature the longer the firing time, to decompose said alkaline-earth carbonate to an emissive oxide coating which is chemically stable in air.

References Cited

UNITED STATES PATENTS

| | | | |
|---|---|---|---|
| 2,700,000 | 1/1955 | Levi et al. | 117—223 |
| 3,041,209 | 6/1962 | Beggs | 117—219X |
| 3,118,080 | 1/1964 | Koppius | 117—223X |

WILLIAM L. JARVIS, Primary Examiner

U.S. Cl. X.R.

117—224, 229; 313—108